(12) United States Patent
Sinnett et al.

(10) Patent No.: US 7,661,300 B2
(45) Date of Patent: Feb. 16, 2010

(54) FLEX SIGNATURE FOR TIRE CONDITION

(75) Inventors: Jay C. Sinnett, Greenville, SC (US); John David Adamson, Simpsonville, SC (US); George P. O'Brien, Piedmont, SC (US); David Bertrand, Besançon (FR); Pierrick Travert, Beaumont (FR)

(73) Assignees: Michelin Recherche Et Technique S.A., Granges-Paccot (CH); Societe de Technologie Michelin, Clermont-Ferrand (FR)

( * ) Notice: Subject to any disclaimer, the term of this patent is extended or adjusted under 35 U.S.C. 154(b) by 0 days.

(21) Appl. No.: 11/792,834

(22) PCT Filed: Mar. 11, 2005

(86) PCT No.: PCT/US2005/007819

§ 371 (c)(1),
(2), (4) Date: Mar. 31, 2008

(87) PCT Pub. No.: WO2006/098714

PCT Pub. Date: Sep. 21, 2006

(65) Prior Publication Data

US 2008/0302177 A1   Dec. 11, 2008

(51) Int. Cl.
*B60C 23/02* (2006.01)
(52) U.S. Cl. ..................................................... 73/146.5
(58) Field of Classification Search .................... 73/146, 73/146.5; 152/152.1, 209.1
See application file for complete search history.

(56) References Cited

U.S. PATENT DOCUMENTS

| | | | |
|---|---|---|---|
| 5,749,984 A | 5/1998 | Frey et al. | |
| 7,523,656 B1* | 4/2009 | Blixhavn et al. | 73/146.5 |
| 2003/0209064 A1* | 11/2003 | Adamson et al. | 73/146 |
| 2004/0196149 A1 | 10/2004 | Dufournier | |
| 2004/0211250 A1* | 10/2004 | Adamson et al. | 73/146 |
| 2004/0211503 A1 | 10/2004 | Matsumoto et al. | |
| 2005/0109095 A1* | 5/2005 | Sinnett | 73/146.5 |
| 2005/0210984 A1* | 9/2005 | Sengupta | 73/635 |
| 2005/0263230 A1 | 12/2005 | Merino Lopez | |
| 2006/0207319 A1* | 9/2006 | Krozer et al. | 73/146 |
| 2008/0168833 A1* | 7/2008 | Awad | 73/146 |
| 2008/0245455 A1* | 10/2008 | Spetler | 152/209.1 |
| 2008/0289407 A1* | 11/2008 | Gramling et al. | 73/146.5 |

\* cited by examiner

*Primary Examiner*—Andre J Allen
(74) *Attorney, Agent, or Firm*—Dority & Manning, P.A.

(57) ABSTRACT

Disclosed is a methodology for deriving data related to various selected tire (10) conditions. One or more sensors are analyzed in a manner similar to that of analyzing an electrocardiogram taken from a human patient in order to determine selected operational characteristics of the monitored tires (10). Analysis of the signal waveforms may involve analysis of a single waveform and/or comparison of paired waveforms originating for sensors associated with a single tire or paired tires (10).

19 Claims, 6 Drawing Sheets

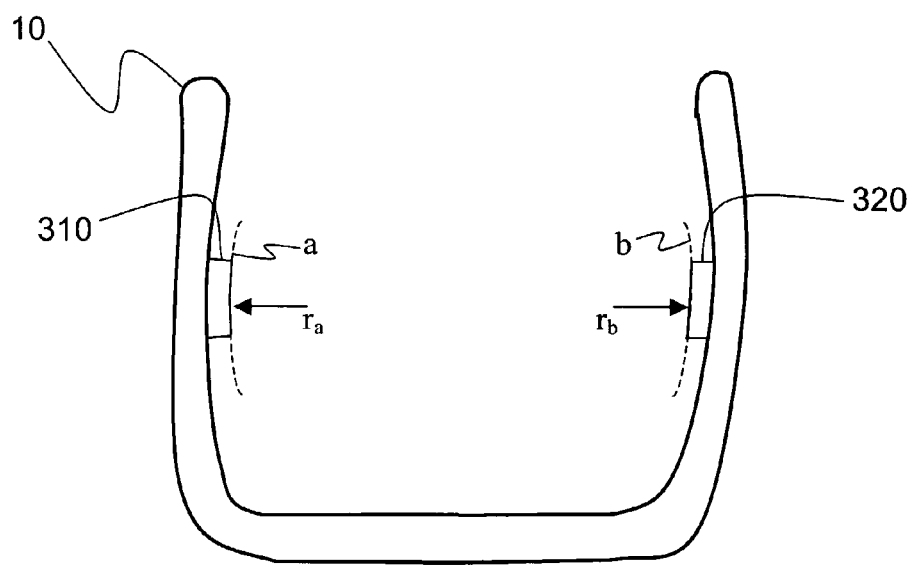
Fig. 6
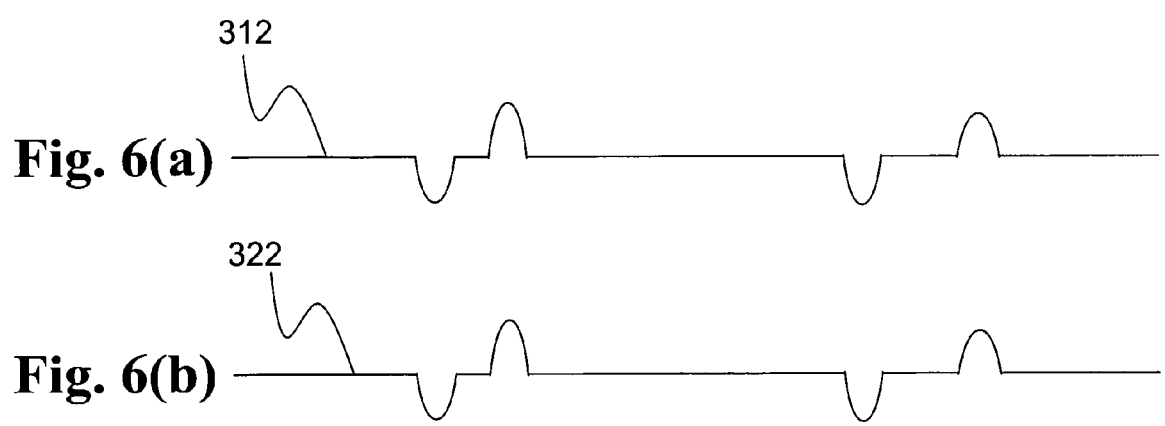
Fig. 6(a)
Fig. 6(b)

FLEX SIGNATURE FOR TIRE CONDITION

FIELD OF THE INVENTION

The present subject matter concerns tire condition-monitoring systems for use with vehicle tires. More particularly, the present subject matter concerns enhancements to such systems; especially methodology for identifying selected tire related parameters based, in part, on the nature of waveforms generated by associated tire sensors.

BACKGROUND OF THE INVENTION

The incorporation of electronic devices with pneumatic tire and wheel structures yields many practical advantages. Tire electronics may include sensors and other components for relaying tire identification parameters and also for obtaining information regarding various physical parameters of a tire, such as temperature, pressure, tread wear, number of tire revolutions, vehicle speed, etc. For example, U.S. Pat. No. 5,749,984 to Frey et al. discloses a tire monitoring system and method that is capable of determining such information as tire deflection, tire speed, and number of tire revolutions. Such performance information may become useful in tire monitoring and warning systems, and may even potentially be employed with feedback systems to regulate proper tire parameters or vehicle systems operation and/or performance.

Yet another potential capability offered by electronics systems integrated with tire structures corresponds to asset tracking and performance characteristics for commercial as well as other type vehicular applications. Commercial truck fleets, aviation craft and earth mover/mining vehicles are all viable industries that could utilize the benefits of tire electronic systems and related information transmission. Radio frequency identification (RFID) tags can be utilized to provide unique identification for a given tire, enabling tracking abilities for a tire. Tire sensors can determine the distance each tire in a vehicle has traveled and thus aid in maintenance planning for such commercial systems.

One particular area of concern with regard to tire condition monitoring devices and systems and their associated sensors relates to methodologies for deriving the maximum possible data from tire sensors regarding tire and/or vehicle operation. Often these efforts have involved the use of a plurality of different types of variously combined and located sensors to obtain required information.

Example of such include tire pressure-monitoring applications wherein it may also be important or critical to track other tire or vehicle related parameters such as tire temperature, rotational speed, distance traveled, distances travel at particular speeds, and other parameters. In addition to these types of data that may be used for more or less historical record keeping, data may be collected and reported on a real time basis. With respect to tire pressure monitoring systems, real time reporting to a vehicle operator of a low-pressure condition may become of critical importance if the low-pressure condition becomes suddenly extreme upon occurrence of, for example, rapid air loss that may affect directional control or stability of the vehicle especially if the vehicle is being operated at highway speeds. In addition tire sensors may be actively employed in the real time control of certain functions of the vehicle. Examples of these functions may include antilock or anti-skid braking systems.

While various implementations of vehicle tire condition monitoring systems have been developed, and while various combinations of sensors have been provided using conventional technologies, no design has emerged that generally encompasses all of the desired characteristics as hereafter presented in accordance with the subject technology.

SUMMARY OF THE INVENTION

In view of the recognized features encountered in the prior art and addressed by the present subject matter, an improved methodology for deriving data related to various selected tire conditions has been developed. It should be noted that although the principal portion of the remainder of the present disclosure may refer to the use of piezoelectric based sensors integrated with or mounted in or on a tire, such use is not intended to represent a specific limitation of the present technology as, in fact, other types of sensors may be employed in combination with signal processing methodologies as will be more fully described later. Moreover, it should be readily apparent to those of ordinary skill in the art that a data transmission and processing mechanism must be associated with the signals obtained from the various sensors such that data may be passed to and/or from the monitored tires for either concurrent or subsequent processing. In addition, although reference is made to association of sensors and the processing of signals with respect to pneumatic tires, such is not a specific limitation of the present technology as the presently disclosed concepts may also be applied to non-pneumatic tires.

In an exemplary embodiment, a waveform generated by a tire sensor is examined and analyzed to determine a number of selected tire and vehicle related parameters. In a manner somewhat analogous to an electro-cardiogram (EKG) performed on a human patient, the present technology proposes a similar analysis of the waveform produced by tire-associated sensors.

In further exemplary embodiments of the present technology, one or more tire-associated sensors may be mounted in or on a tire thereby providing one or more signals that may be analyzed to determine a plurality of tire and/or vehicle related parameters. Non-exhaustive examples of such include but are not limited to, sensors mounted on various inside surfaces of a tire including at the summit, i.e., on the inside liner in an area opposite the treads, on the inside of the sidewall of the tire, on the outside surface of the sidewall, and/or integrated into the structure of the tire itself.

With more specific reference to an exemplary embodiment of the present subject matter, a piezoelectric sensor, also referred to herein as a piezoelectric patch, may be secured in or on a vehicle tire. It has been demonstrated that piezoelectric tire sensors are extremely sensitive devices and will respond to virtually any force applied anywhere on a tire with which such a sensor may be associated. Selective analysis of the signals obtain from such sensors should, therefore, be able to provide a wealth of information.

Additional positive aspects of the use of piezoelectric sensors include the possibility of providing a dual function sensor in that the sensor may also be employed as a power source for operating various components that may be associated with the sensor. Such components may include, but are not limited to, elements such as a microprocessor, memory elements, data transmission and reception circuitry, and other elements or components as may be desired for any particular situation or installation.

Another positive aspect of the use of piezoelectric sensors and the waveform analysis methodology of the present technology resides in the capability of providing independent evaluations of data derived from other tire related sources. For example, through use of the present analysis methodology, independent estimations of whether a tire is overloaded and/or underinflated can be made.

Additional aspects of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 diagrammatically illustrates the combination of a tire and a plurality of tire parameter sensor;

FIGS. 6(a) and 6(b) illustrate exemplary waveforms generated by sensors associated with the tire illustrated in FIG. 6;

Figure 1:
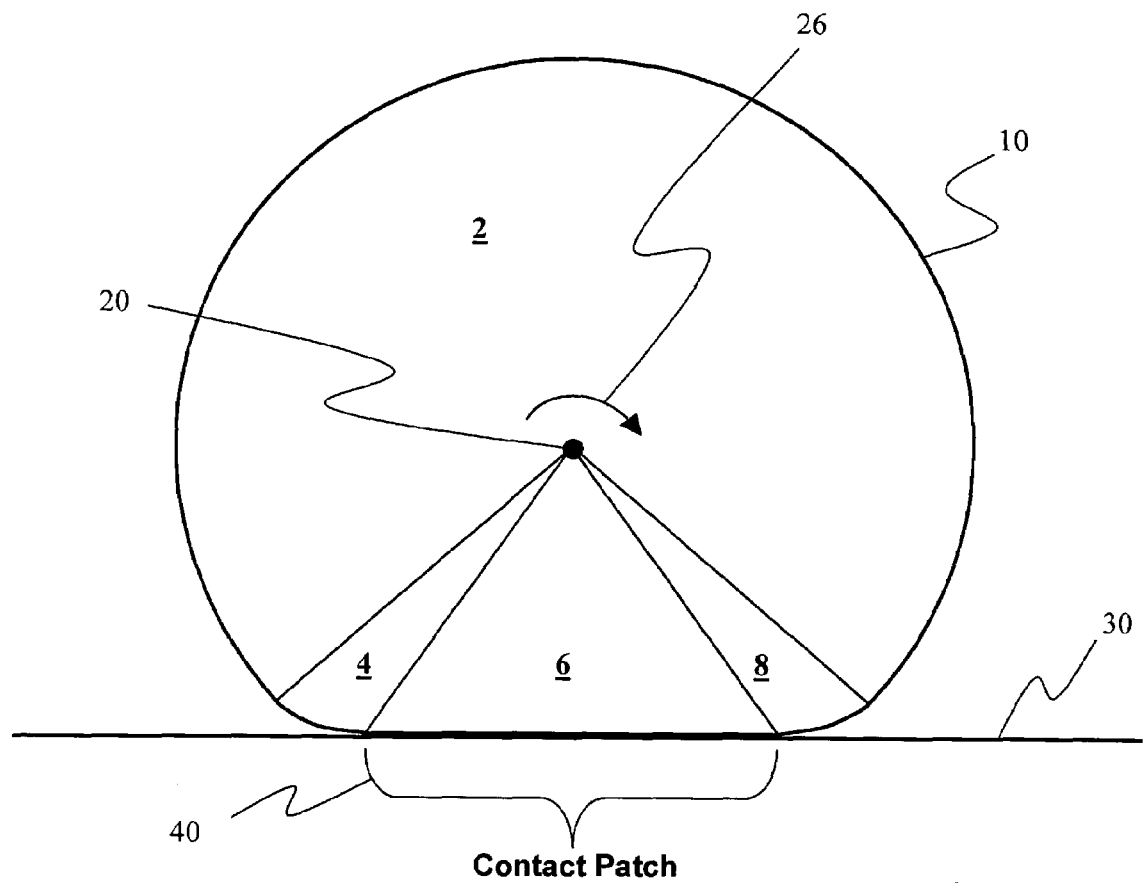
FIG. 1 diagrammatically illustrates a tire profile as it might appear while in rolling contact with a surface.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present subject matter is particularly concerned with methodologies for deriving data from sensors associated with tires. More particularly, the present subject matter recognizes that significant tire related data can be derived from an analysis of the waveforms generated by various tire sensors during the operation of vehicles to which such tires may be mounted as the tires flex under pressures applied to the tires during operation or movement. As will be more fully explained later, such flexing of the tires during operation produces, via associated sensors, a "signature" waveform that, when analyzed, may be used to reveal significant data regarding current tire conditions. By analogy, it is well know that a doctor can analyze a patient's electro-cardiogram and discern many different conditions of the human heart as revealed in the heartbeat. Similarly, the signature of strain on the inside of a tire may be made use of as a rich source of information about the state of the tire.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar functions.

Reference will now be made in detail to the presently preferred embodiments of the subject flex signature methodologies. Referring now to the drawings, FIG. 1 diagrammatically illustrates a tire 10 mounted for rotation about an axis 20, in contact with a surface 30 such that the tire and surface contact produces a contact patch delineated by bracket 40.

As may be seen represented in FIG. 1, the flex signature analysis of the present technology takes advantage of the fact that there are fundamentally four zones of different curvature within an inflated, loaded tire. A major portion of the tire is represent by area 2 and corresponds to that portion of the tire 10 that is neither currently in contact with the surface 30 nor being significantly flexed by way of being in close proximity to area 6 that corresponds to that portion of the tire that is in full contact with surface 30. Tire portions 4 and 8 may be considered as transition areas that, in the static case, i.e. at vehicle stand still or uniform motion, are identical, but which become different under driving or braking conditions, as will be more fully explained later. In the context of the present discussion, transition zone 8, assuming the direction of tire rotation is that shown by arrow 26 may be considered an "entry" zone while transition zone 4 may be considered an "exit" zone and zone 6 may be considered a "contact" zone.

Figure 2:
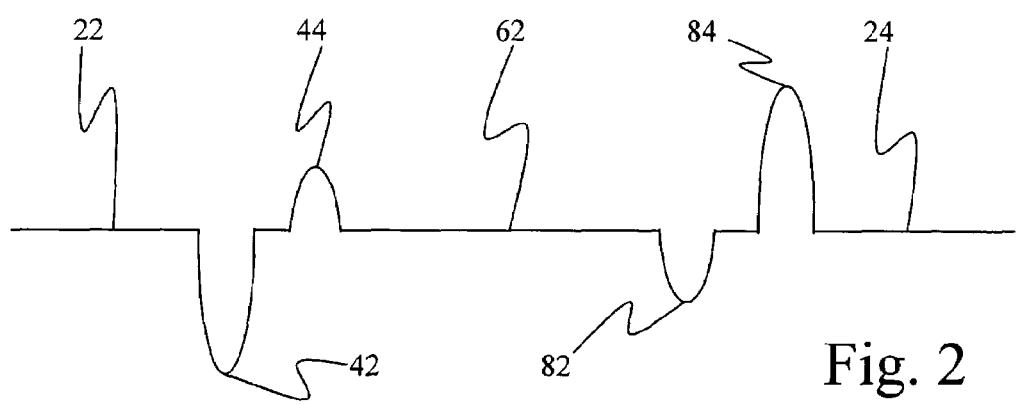
FIG. 2 diagrammatically illustrates a representative signal produced by a tire sensor mounted in association with the tire of FIG. 1 as it rolls in contact with a surface.

Referring now to FIG. 2, diagrammatically illustrated therein is a representation of a waveform or "flex signature" produced by an exemplary tire-associated sensor in accordance with the present technology. As a non-limiting example, the tire-associated sensor may be a piezoelectric sensor that may be self-powered or separately powered or may combine elements of both power-supplying forms to operate the sensor. Moreover, the waveform generating sensor may correspond to other available or yet to be developed sensors. As should be clear, the concepts associated with the present technology do not reside in the particular type of sensor employed but rather in the recognition that flex signature waveform analysis may be applied to a waveform generated by any suitable sensor and that significant tire related data may be determined there from without reliance thereon, necessarily, of any one particular sensor type.

A principal concept of the present technology is to examine waveforms representing longitudinal and/or lateral strain on the inside surface of a tire, particularly, but not exclusively, at the summit, on the liner opposite the tread. By actually measuring the curvature in each of the four zones, as well as the size or extent of the zones based on the time signature, it is possible to determine many facts about the condition and use of a tire. As previously mentioned, it has been demonstrated that piezoelectric tire sensors are extremely sensitive devices and will respond to virtually any force applied anywhere on a tire with which such a sensor may be associated. Thus, while the use of such piezoelectric sensors is advantageous to the present technology, such use is not a limitation of the present subject matter.

Appropriate analysis of signals obtained from such sensors will yield many parameters of practical interest such as speed (not only as a function of time, but also as a function of waveform due to centrifugal force); loading; tire pressure; a condition of under pressure or overload (perhaps independently, since changes in stiffness are not identical to changes in deflection); tread wear (the thickness of the beam changes with wear, thus changing the location of the neutral plane and the stiffness of the beam); driving/braking torque (the footprint of entry and exit curvatures change); belt separation (the sensor is so sensitive it is responsive to nonuniformity anywhere in the tire, not just underneath the sensor); skidding (high-frequency components appear); longitudinal force; lateral force (particularly if a second sensor is installed laterally); hydroplaning; self-aligning torque; and camber.

With further reference to FIG. 2, an exemplary waveform illustrates a signal produced by a sensor associated with a tire under a condition of uniform motion. As illustrated, as tire 10 rotates about axis 20 in the direction of arrow 26, a perturbation is produced in the waveform as the tire enters and leaves each of the previously identified four zones. For example, wave segment 22, and its repeating companion segment 24 corresponds to a signal produced by the portion of the tire that is currently out of contact with surface 30. Positive going pulse 84 represents the beginning of the entry zone, i.e. the transition between non-contacting tire segment 2 and the beginning of the fully contacting segment 6. Negative going pulse 82 represents the end of the entry zone 8 and the beginning of the contact zone 6. Waveform segment 62 corresponds to contact zone 6. Positive pulse 44 corresponds to the end of the contact zone 6 and the beginning of the exit zone 4. Negative going pulse 42 corresponds to the end of exit zone 4 and the beginning of the non-contact zone 2.

As is apparent from the FIG. 2 waveform, in a steady state condition, the pulses representing the beginning and end of the respective entry zone 8 and exit zone 4 are identical. Moreover, the spacing between the beginning and ending pulses of these zones are identical. Analysis of the amplitude and time difference between the various pulses can result in determining such information as tire rotational speed, tire loading, pressure, over and under pressure conditions and other parameters as outlined previously.

Figure 3:
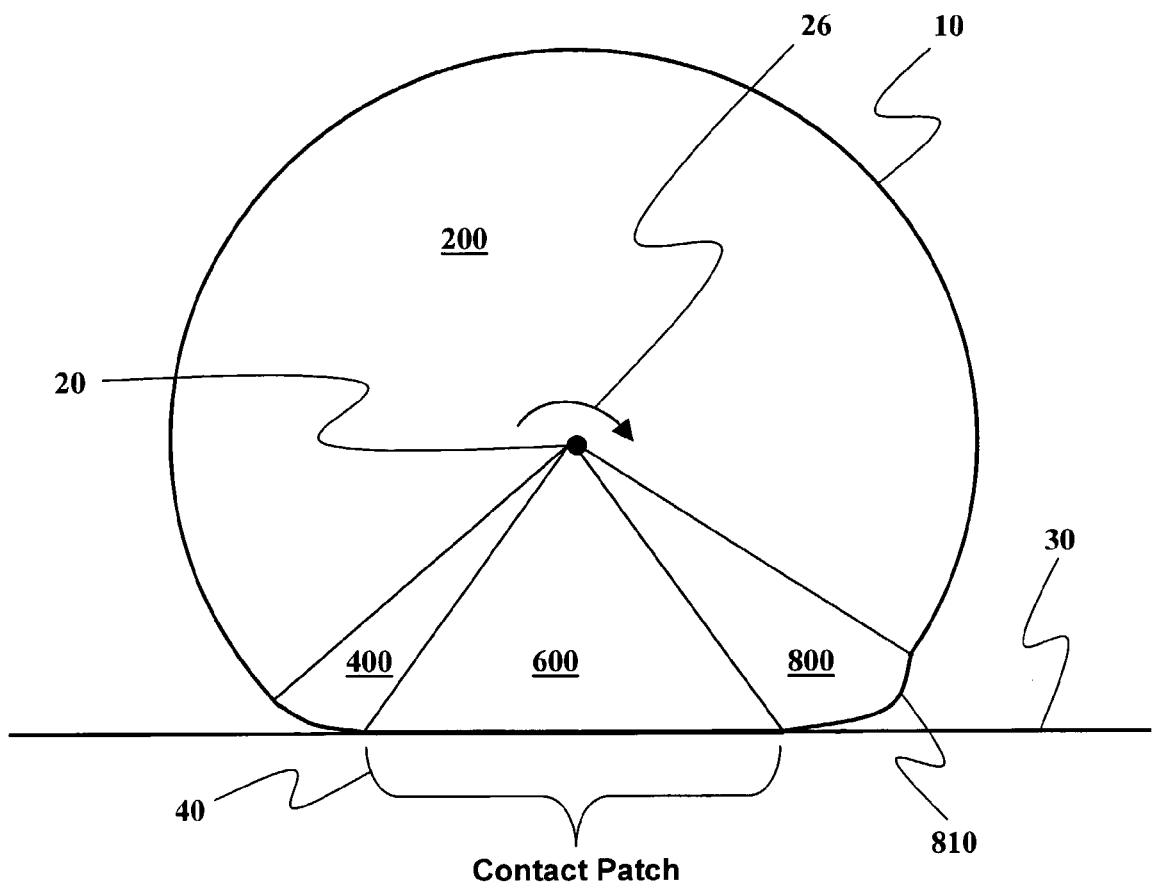
FIG. 3 diagrammatically illustrates a tire profile as it might appear while in rolling contact with a surface during a time of vehicle acceleration.

Referring now to FIG. 3, illustrated therein is an exemplary tire profile as might be seen during vehicle acceleration. As with the profile illustrated in FIG. 1, four distinct tire zones may be identified. These zones may be identified as non-contacting zone 200, entry zone 800, contact zone 600 and exit zone 400. The principal difference between the tire profiles illustrated in FIG. 1 and that of FIG. 3 may be seen at entry zone 800. More particularly, as the vehicle experiences acceleration, the tire will tend to "dam up" or bulge as illustrated at 810 in FIG. 3. This phenomenon occurs, in part, because of the traction between the tire in the contact zone 600 and the surface 30 coupled with the compression of the tire material in the direction of tire rotation 26 as a result of the increased torque applied to the tire. Variations in the extent of the contact zone 600 and exit zone 400 may also be observed as a result of the vehicle acceleration.

Figure 4:
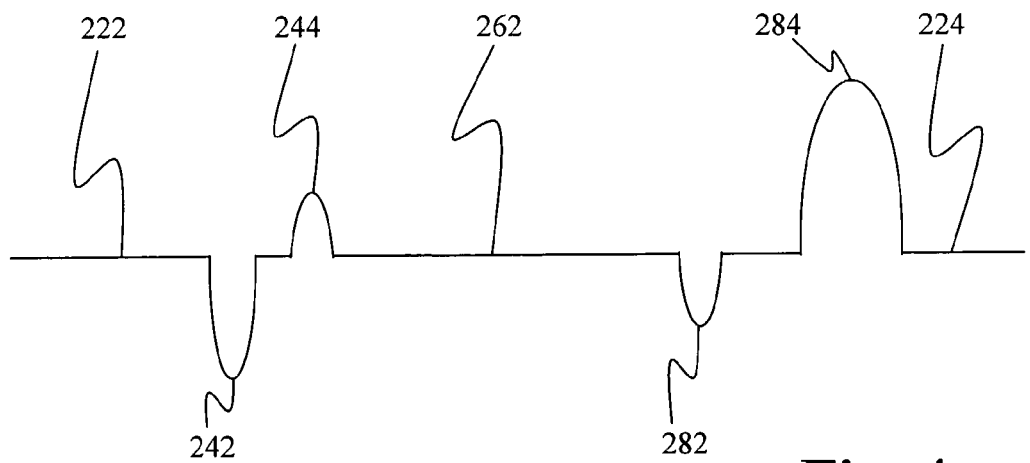
FIG. 4 diagrammatically illustrates a representative signal produced by a tire sensor mounted in association with the tire of FIG. 3 as it rolls in contact with a surface.

Referring now to FIG. 4, an exemplary waveform produced by sensors associated with tire 10 under the acceleration conditions noted may be seen. As is apparent, the waveform illustrated in FIG. 4 differs from that of FIG. 2 primarily in the shape and spacing between pulses 284 and 282 from those of pulses 84 and 82 of FIG. 2. Analysis of the waveform parameters associated with these pulses vis-à-vis those of FIG. 2 can produce data indicative of the acceleration, rate of acceleration, torque applied, and other parameters as previously mentioned. For example, it is seen that pulse 284 is wider and has higher amplitude than corresponding pulse 84 illustrated in FIG. 2. In addition, pulses 282 and 284 of FIG. 4 are more widely separated that corresponding pulses 82 and 84 respectively of FIG. 2. These differences may be analyzed to give an indication of the change in curvature of the entry zone 800 vis-à-vis that of static entry zone 8 illustrated in FIG. 1.

In a similar fashion, additional data may be determined by analysis of the various pulses. For example, the time between consecutive occurrences of any single pulse 42, 44, 82, 84, 242, 244, 282, or 284 may be used as an indication of instantaneous speed. The time difference between pulses 44 and 82 or 244 and 282 may be used as an indication of tire pressure or loading. Rapid changes in the time difference between these sets of pulses may be used as an indication of rapid loss of pressure as in a rapid air loss condition.

Although not illustrated here, it should now be apparent that a similar tire profile and waveform as those illustrated in FIGS. 3 and 4 respectively would be generated under braking conditions except the "damming up" or bulging phenomena would be associated with the exit zone 400 as opposed to the entry zone 800. Consequently the waveform of FIG. 4 would display more significant differences in pulses 244 and 242 vis-à-vis those of pulses 44 and 42, respectively, illustrated in FIG. 2. Analysis of such pulses under braking conditions would also yield significant tire and vehicle related data including deceleration information, traction information, information relating to skidding and hydroplaning, and other data as also previously mentioned. Analysis of the differences between contact patch size, as illustrated at 6 in FIG. 1 and at 62 in the waveform of FIG. 2 versus the contact patch size 600 of FIG. 3 and 262 of FIG. 4 would also reveal significant tire related data including information related to tire pressure and downward force applied to the tire. These later aspects obtain more significance when considering the differences in pressure or downward force between pairs of tires as will be more fully explained later.

Figure 5:
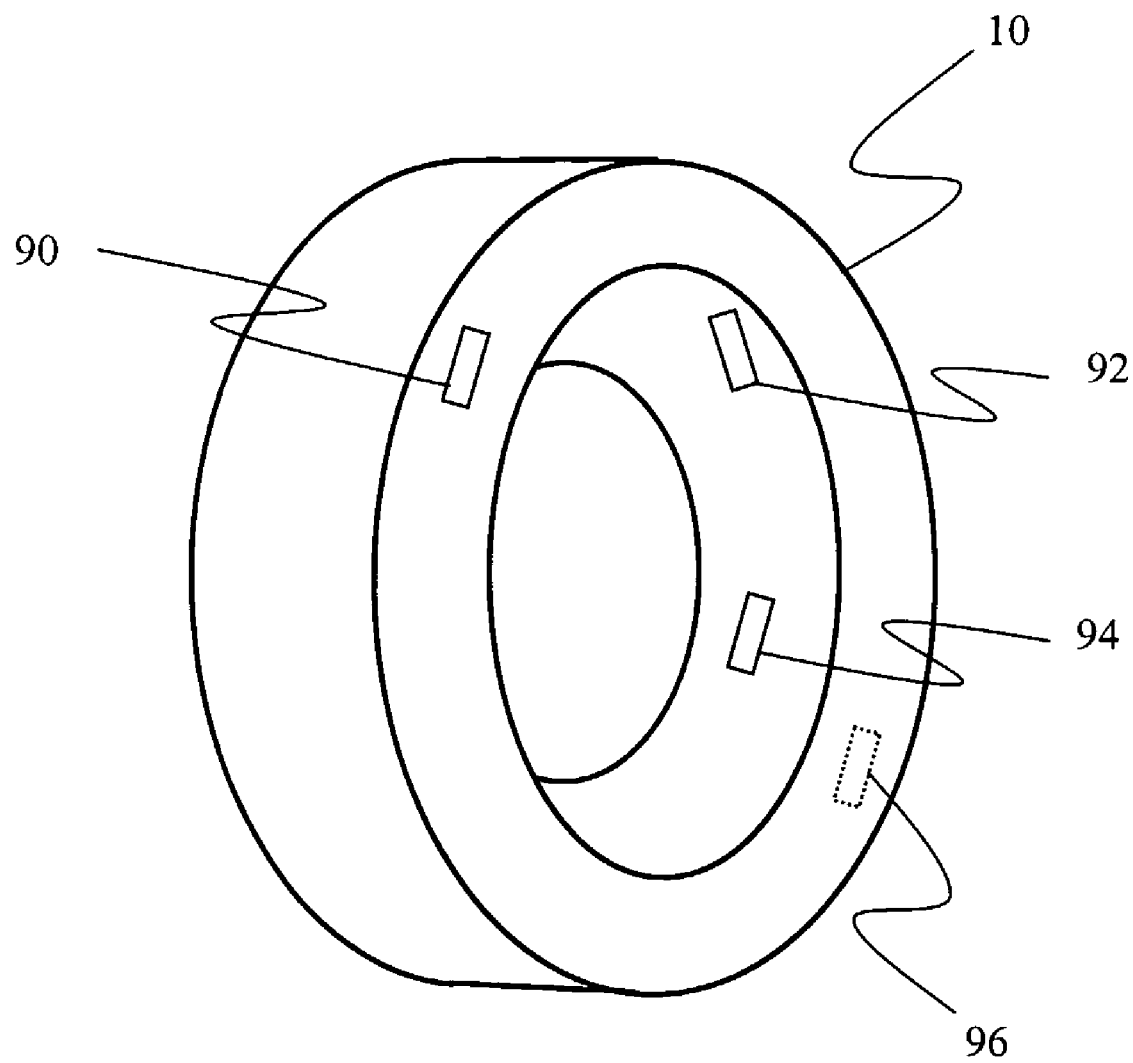
FIG. 5 diagrammatically illustrates the combination of a tire and alternative locations for tire parameter sensors.

With reference now to FIG. 5, illustrated therein are several alternative locations where sensors may be mounted in, on or within a tire in accordance with the present technology. As illustrated in FIG. 5, one or more sensors may be associated with tire 10 by mounting such sensors on the outside of the side wall as at 90, on the crown of the tire as at 92, on the inside of the sidewall as at 94, or physically embedded within the tire structure as illustrated by the dotted line rectangle at 96. Any, some or all of these locations might be used for sensor location in any one tire. Moreover, plural sensors may be arranged such that both linear and lateral forces may be more easily detected to obtain the widest possible range of discernable data. In addition, it is not a limitation of the present technology that all of plural sensors should be of the same type. To the contrary, plural types of sensors may be employed as desired or necessary to obtain individual flex signatures that may be more or less responsive to particular types of conditions.

Referring now to FIG. 6, a variation of the previously described tire and sensor combination will be addressed. As previously noted, the present subject matter contemplates the association of more than one sensor with any one tire. One such embodiment has been diagrammatically illustrated in FIG. 6 wherein a pair of sensors 310, 320 is mounted on opposite interior sidewalls of tire 10. As illustrated in FIG. 6, the tire may be considered as being associated with a vehicle that is traveling forward along a straight line. In this regard, it is significant to note that the side walls of the tire 10 are both experiencing substantially the same forces, $r_a$, $r_b$ and that the sidewalls, per se, are each contoured in substantially the same way as illustrated by curves "a" and "b." These conditions prevail, in part, due to a lack of lateral force being applied to the tire. As may be seen from FIGS. 6(a) and 6(b), the waveforms 312, 322 generated by sensor 310, 320 under the described conditions are substantially identical.

Figure 7:
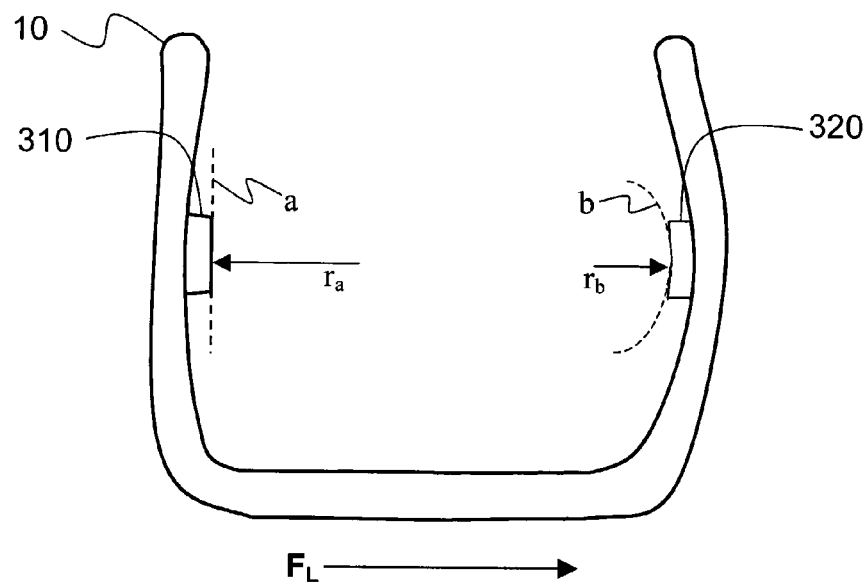
FIG. 7 diagrammatically illustrates an exemplary view of the tire illustrated in FIG. 6 experiencing a lateral force.
Figure 7A:
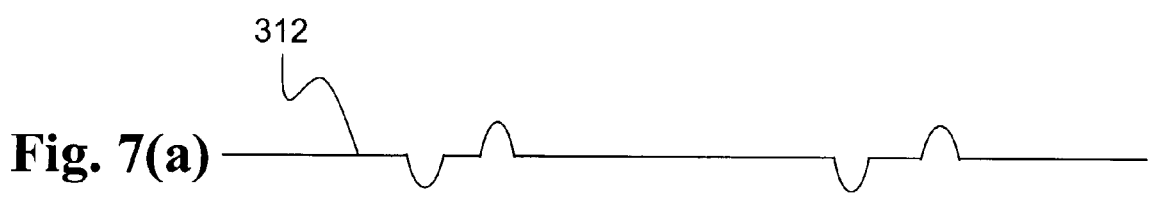
FIGS. 7(a) and 7(b) illustrate exemplary waveforms generated by the sensors associated with the tire illustrated in FIG. 7 resulting from an applied lateral force.
Figure 7B:
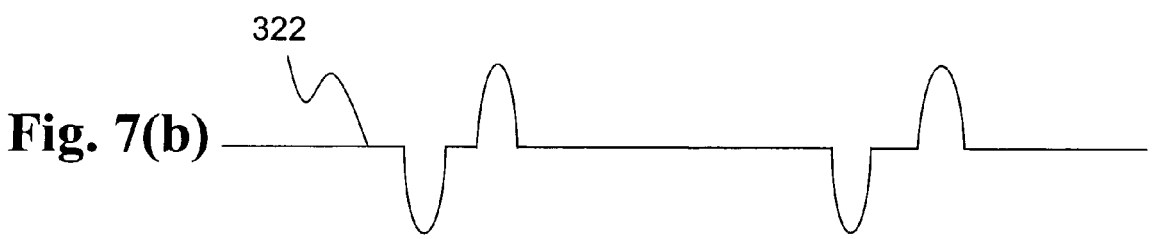

With reference now to FIG. 7, it will be seen that a tire that is otherwise substantially identical to that illustrated in FIG. 6 is shown illustrating the effects of the application of a lateral force as represented by arrow $F_L$. The lateral force applied to tire 10 may be occasioned from a number of sources including that the associated vehicle is undergoing a turning motion. Generally such motion will produce an uneven deformation in the sidewalls of tire 10 as illustrated by substantially straight profile "a" associated with the sidewall to which sensor 310 is illustratively associated and a more curved profile associated with the sidewall to which sensor 320 is illustratively associated. Under these conditions, sensors 310 and 320 will produce waveforms 312, 322 respectively as illustrated in FIGS. 7(a) and 7(b). As will be appreciated from the waveforms illustrated, the amplitude of the signal 312 associated with sensor 310 is less than the amplitude of the signal 322 associated with sensor 320. In addition, the amplitude of signal 312 as illustrated in FIG. 7(a) is proportionately less than that of the same signal illustrated in FIG. 6 while the opposite is true for signal 322 with respect to the representations illustrated between FIGS. 7(b) and 6(b).

These changes in amplitude of the signals 312, 322 over what may be considered a baseline signal as exemplarily illustrated under the operating conditions described as illustrated in FIG. 6, i.e., absent the application of a lateral force and in uniform forward motion, are due, in part, from the uneven forces applied to the tire due to the lateral force. The differences between the signals generated by sensors 312, 322 may then be analyzed to determine tire related information of concern, including, of course, the amount of lateral force being applied to the tire. Should the signal being generated from the upstream side of the applied lateral force (sensor 310 and signal 312 in the present example) drop to zero or, at least, a very low value, while a signal of significant value is being produced by the downstream sensor, such might be taken as an indication that the vehicle with which the tire is associated is in danger of rolling over.

Figure 8:
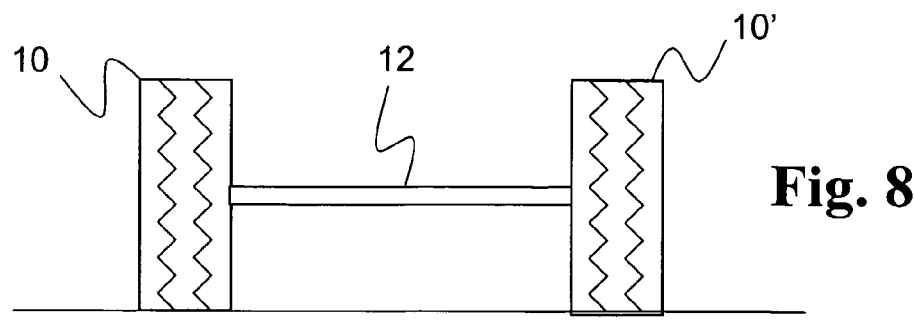
FIG. 8 diagrammatically illustrates a pair of tires to which no lateral force is being applied.

Turning now to the remaining Figures, an example is given of an embodiment of the present subject matter that discloses association of plural sensors with tire pairs. With reference to FIG. 8, there is exemplarily illustrated a pair of tire 10, 10' that may be associated with a common axle 12 of a vehicle (not shown). As represented in FIG. 8, tire 10, 10' may be considered to be associated with a vehicle traveling along a straight path such that tire 10, 10' experience no lateral forces. In addition, the contact patch associated with each tire 10, 10' respectively will be approximately equal assuming approximately equal inflation pressure in each tire. Sensors, not shown in FIGS. 8 and 9, may be associated with tires 10, 10' in the manner illustrated and previously discussed with respect to FIG. 5. As with other embodiments of the present subject matter, the present embodiments provide for the inclusion of a plurality of sensors associated with each of the tires 10, 10' however, the present discussion will be directed to the comparison of signals generated from sensors associated with separate tires 10, 10' without regard to the type of sensor as sensor type is not a limiting factor to the present subject matter.

Figure 9:
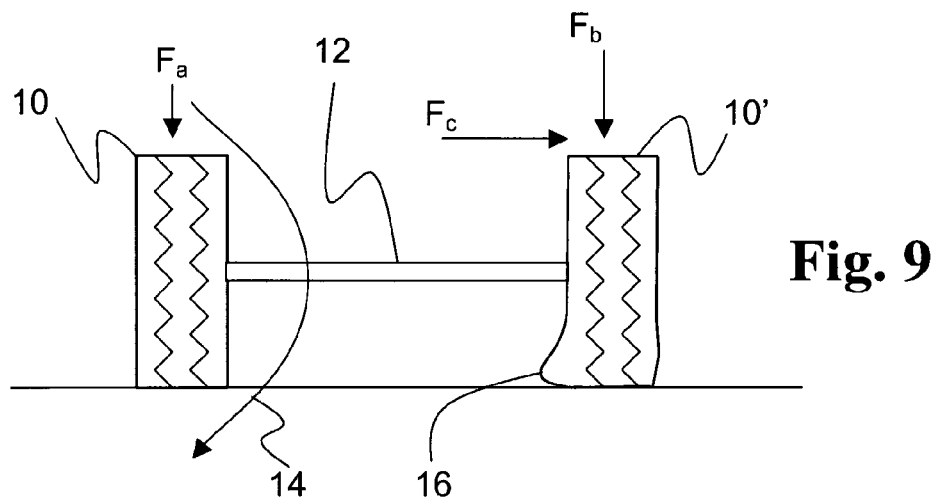
FIG. 9 diagrammatically illustrates a pair of tire to which a lateral force is being applied.

With respect to the configuration illustrated in FIG. 9, there is illustrated a pair of tires 10, 10' associated with a common axle 12. It should be understood that the present example is illustrative only and that the tire pairs need not be associated with the same axle or even be mounted on opposite sides of a vehicle to take advantage of the present technology. Illustrated in FIG. 9 is a tire pair 10, 10' representatively illustrated as might be observed as a vehicle enters a curve along a road as illustrated by arrow 14. Although there are, of course, a number of different forces being applied to a vehicle and associated tires during such a maneuver, principal consideration will be given herein to three forces. These three forces are represented by downward arrows $F_a$ and $F_b$ representing the downward force applied to tires 10, 10', respectively, during the course of the transition through curve 14. As may be seen from FIG. 9, the force $F_b$ on tire 10' will be higher than the force $F_a$ on tire 10. The longer arrow associated with $F_b$ than that associated with $F_a$ represents such difference in force.

The third force of present interest is a lateral force illustrated diagrammatically by arrow $F_c$. This lateral force, combined with the downward force $F_b$ produces a displacement 16 in a portion of tire 10' and, at the same time, increases the size of the contact patch associated with tire 10'. As will be recalled by reference to FIG. 1, the contact patch area 6 is that area of the tire that is in contact with the surface over which the tire passes. In the embodiment of the present invention illustrated in FIG. 9, this contact patch may be accurately measured by data generated from sensors associated with tires 10, 10' as represented in FIGS. 9(a) and 9(b).

Figure 9A:
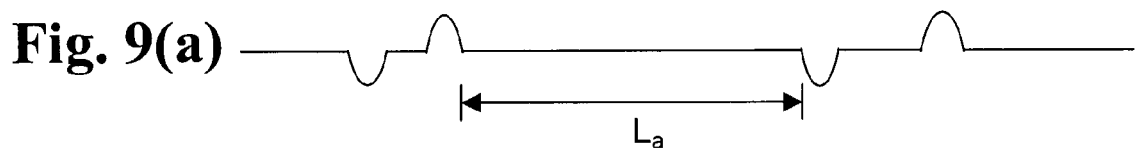
FIGS. 9(a) and 9(b) illustrate exemplary waveforms generated by sensors associated with the tires illustrated in FIG. 9 during the application of a lateral force.
Figure 9B:
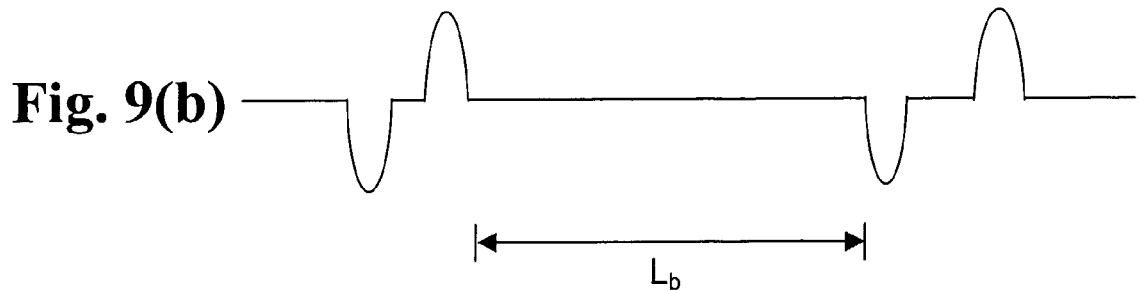

FIG. 9(a) represents a signal produced from a sensor associated with tire 10 while FIG. 9(b) represents a signal produced from a sensor associated with tire 10'. As will be observed from a comparison of FIGS. 9(a) and 9(b), the amplitude of the signal illustrated in FIG. 9(a) is significantly less than that illustrated in FIG. 9(b). Moreover, the time difference between signal portion $L_b$ of FIG. 9(b) and $L_a$ of FIG. 9(a), $L_a$ and $L_b$ being representative of the size of the contact patch for tires 10, 10', respectively, may be used as an indication of the combined effect of the lateral force $F_c$ and the downward force $F_b$. As the downward force $F_b$ and the lateral force $F_c$ become greater, the contact patch size of tire 10', as represented by signal portion $L_b$ of FIG. 9(b) becomes larger while the contact patch size of tire 10, as represented by signal portion $L_a$ of FIG. 9(a) becomes smaller. At the same time the amplitudes of the respective signals from sensors associated with tire 10' will increase while the amplitude from sensors associated with tire 10 will decrease. As the signal amplitude from sensors associated with tire 10 becomes smaller either absolutely and/or relative to the signals from the sensors associated with tire 10', a determination may be made that tire 10 is losing contact with the road surface, i.e., the vehicle may be in danger of overturning.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for determining selected tire and tire zone related information, comprising the steps of:
   providing a tire;
   associating one or more electronic signal producing sensors with the tire;
   rolling the tire over a surface whereby plural zones are established about the tire corresponding to at least a non-contact zone, an entry zone, a contact zone and an exit zone;
   monitoring the electronic signals produced by the one or more sensors as the tire traverses selected of the zones; and
   analyzing selected characteristics of the electronic signals to determine selected tire and tire zone related information.

2. The method of claim 1 wherein the step of associating comprises affixing one or more electronic signal producing sensors to one or more of an inside portion of a sidewall of the tire, an outside portion of a sidewall of the tire, and an inside portion of the summit of the tire.

3. The method of claim 1 wherein the step of associating comprises embedding one or more electronic signal producing sensors within the tire.

4. The method of claim 2 wherein the step of associating further comprises the step of embedding one or more electronic signal producing sensors within the tire.

5. The method of claim 1 wherein the step of analyzing comprises analyzing electronic signals produced as the tire traverses selected of the zones to determine characteristics of the curvature of the tire within selected of the zones.

6. The method of claim 1 wherein the step of analyzing comprises analyzing electronic signals produced as the tire traverses selected of the zones to determine characteristics of the extent of selected of the zones.

7. The method of claim 5 wherein the step of analyzing further comprises analyzing electronic signals produced as the tire traverses selected of the zones to determine characteristics of the extent of selected of the zones.

8. The method of claim 1, wherein the step of analyzing corresponds to determining information relating to one or more of speed, loading, tire pressure, under pressure, overload, tread wear, uneven tread wear, driving torque, braking torque, belt separation, longitudinal force, lateral force, hydroplaning, self aligning torque, and camber.

9. A method for determining selected tire related information from signals produced by one or more sensors associated with a tire, comprising the steps of:
   establishing a plurality of spatially diverse zones corresponding to diverse portions of a tire;
   monitoring signals associated with selected of the plurality of spatially diverse zones; and
   analyzing the signals to evaluate at least one characteristic of selected of the plurality of diverse zones.

10. The method of claim 9, wherein the step of analyzing comprises evaluating the curvature of selected of the plurality of diverse zones.

11. The method of claim 9, wherein the step of analyzing comprises evaluating the extent of selected of the plurality of diverse zones.

12. The method of claim 10, wherein the step of analyzing further comprises evaluating the extent of selected of the plurality of diverse zones.

13. A method of determining selected tire related information, comprising the steps of:
   providing one or more tires;
   associating a plurality of electronic signal producing sensors with the one or more tires;
   establishing a plurality of spatially diverse zones corresponding to diverse portions of the one or more tires;
   monitoring signals associated with selected of the plurality of spatially diverse zones; and
   analyzing the signals to evaluate at least one characteristic of selected of the plurality of diverse zones.

14. The method of claim 13, wherein the step of associating comprises associating paired sensors with a single tire.

15. The method of claim 13, wherein the step of associating comprises associating paired sensors with paired tires.

16. The method of claim 14, wherein the step of analyzing comprises analyzing differences between signals produced by a selected plurality of the plurality of electronic signal producing sensors.

17. The method of claim 15, wherein the step of analyzing comprises analyzing differences between signals produced by a selected plurality of selected of the plurality of electronic signal producing sensors.

18. The method of claim 14, wherein the step of analyzing corresponds to determining information relating to one or more of speed, loading, tire pressure, under pressure, overload, tread wear, uneven tread wear, driving torque, braking torque, belt separation, longitudinal force, lateral force, hydroplaning, self aligning torque, and camber.

19. The method of claim 15, wherein the step of analyzing corresponds to determining information relating to one or more of speed, loading, tire pressure, under pressure, overload, tread wear, uneven tread wear, driving torque, braking torque, belt separation, longitudinal force, lateral force, hydroplaning, self-aligning torque, and camber.

* * * * *